(12) United States Patent
Steffan (10) Patent No.: US 8,271,451 B2
(45) Date of Patent: Sep. 18, 2012

(54) RECORDS ARCHIVE DISPOSITION SYSTEM

(75) Inventor: Joseph C. Steffan, New York, NY (US)

(73) Assignee: Morgan Stanley, New York, NY (US)

( * ) Notice: Subject to any disclaimer, the term of this patent is extended or adjusted under 35 U.S.C. 154(b) by 244 days.

(21) Appl. No.: 12/860,908

(22) Filed: Aug. 22, 2010

(65) Prior Publication Data

US 2012/0047112 A1 Feb. 23, 2012

(51) Int. Cl.
*G06F 17/00* (2006.01)
(52) U.S. Cl. .......................... 707/662; 707/654; 711/159
(58) Field of Classification Search .................. 707/654, 707/661, 662, 665, 770, 780, 942; 711/154, 711/159; 709/203, 217, 219; 345/741
See application file for complete search history.

(56) References Cited

U.S. PATENT DOCUMENTS

| | | | |
|---|---|---|---|
| 7,107,416 B2 * | 9/2006 | Stuart et al. ................... | 711/159 |
| 7,526,621 B2 * | 4/2009 | Stuart et al. ................... | 711/159 |
| 8,090,754 B2 * | 1/2012 | Schmidt et al. ............... | 707/726 |
| 2002/0118222 A1 * | 8/2002 | Fogarty ......................... | 345/741 |
| 2005/0071275 A1 | 3/2005 | Vainstein et al. | |
| 2005/0071657 A1 | 3/2005 | Ryan | |
| 2005/0071658 A1 | 3/2005 | Nath et al. | |
| 2005/0086531 A1 | 4/2005 | Kenrich | |
| 2005/0138371 A1 | 6/2005 | Supramaniam et al. | |
| 2005/0138383 A1 | 6/2005 | Vainstein | |
| 2005/0223242 A1 | 10/2005 | Nath | |
| 2005/0223414 A1 | 10/2005 | Kenrich et al. | |
| 2006/0230044 A1 * | 10/2006 | Utiger ........................... | 707/770 |
| 2006/0282629 A1 * | 12/2006 | Stuart et al. .................... | 711/159 |
| 2007/0294321 A1 * | 12/2007 | Midgley et al. ............... | 707/640 |
| 2008/0263007 A1 * | 10/2008 | Schmidt ........................ | 707/769 |
| 2008/0288479 A1 | 11/2008 | Paknad et al. | |
| 2009/0119354 A1 * | 5/2009 | Stuart et al. ................... | 707/661 |
| 2009/0132262 A1 | 5/2009 | Paknad | |
| 2009/0327021 A1 | 12/2009 | Paknad | |
| 2011/0320494 A1 * | 12/2011 | Fisher et al. ................... | 707/780 |

* cited by examiner

*Primary Examiner* — Shahid Alam
(74) *Attorney, Agent, or Firm* — Weitzman Law Offices, LLC (57) ABSTRACT

A system and method for record archive disposition is implemented with a computer system comprising one or more computer processors operatively connected to memory. Archival records are stored in memory, each archival record being associated with at least one metadata attribute. At least one or more legal holds are stored in memory, each legal hold having legal hold metadata attributes. A deletion candidate list is generated with at least one of the processors for at least one record type by including on the deletion candidate list archival records identified as having one or more archival record metadata attributes corresponding to the at least one record type, and excluding from the deletion candidate list identified archival records if a selected set of legal hold metadata attributes for at least one legal hold corresponds to at least a subset of metadata attributes for the identified archival records. Archival records included on the deletion candidate list are deleted from memory.

26 Claims, 3 Drawing Sheets

RECORDS ARCHIVE DISPOSITION SYSTEM

BACKGROUND

1. Field

This disclosure relates generally to the management of record archives, and, more specifically, to a specialized computing system and computer-implemented method for managing disposition of record archive content, taking into account both the retention periods associated with the content, as well as the application of legal holds.

2. Background

Maintaining organizational records has long been a challenging problem. In order for records to be archived meaningfully, they must be classified and indexed for easy retrieval, stored in physical or digital form, secured and, eventually, destroyed after they are no longer of use to prevent the archive from becoming unmanageably large. This has proven to be a difficult task, and the sheer volume of information and documentation generated by a large, modern business can make this task nearly impossible. A simple but thorough rule set is the first step to the implementation of a successful recordkeeping process. Specific rules and policies are created for the management of records based on regulatory requirements and operational needs of the organization, so that records can be appropriately classified, and associated requirements such as retention periods applied. Increasingly, electronic systems are utilized to ensure appropriate categorization, retention and retrieval of records based on these retention rules.

The necessity of further accommodating "legal holds" on records complicates an already arduous task. In addition to the proactive retention obligations established by an organization's regulatory or operational needs, it may also be required to place records on "legal hold" in order to preserve information relevant to litigation or regulatory matters. Because recordkeeping processes are usually disjointed from the application of legal holds, identifying records that are appropriate for disposition both from a policy and legal hold perspective is typically arduous, labor intensive and generally inefficient. Given the challenge of compensating for potentially many legal holds across physical and electronic archives in a scalable, repeatable and defensible manner, many organizations have effectively suspended their records disposition processes, and are keeping large amounts or records indefinitely out of concern that they might otherwise violate their legal hold obligations, which could result in serious litigation or regulatory consequences.

BRIEF SUMMARY

In one aspect of this disclosure, a system and method for record archive disposition is disclosed. The system and method is implemented with a computer system comprising one or more computer processors operatively connected to memory. Archival records are stored in memory, each archival record being associated with at least one metadata attribute. At least one or more legal holds are stored in memory, each legal hold having legal hold metadata attributes. A deletion candidate list is generated with at least one of the processors for at least one record type by including on the deletion candidate list archival record objects identified as having one or more archival record metadata attributes corresponding to the at least one record type. The correspondence between the one or more archival record metadata attributes to the at least one record type preferably establishes a legal hold threshold disposition eligibility based on a retention rule (e.g., objects in record class "customer statements" may be eligible for disposition ten years following their associated metadata attribute "statement date"). Archival record objects whose metadata attributes correspond to the legal hold metadata attributes are excluded from the deletion candidate list (e.g., for a legal hold "matter 1," the system may not permit destruction of objects in record class "customer statements" when the objects possess a subset of metadata attributes describing "statement dates" falling between Mar. 1, 1999 and Jun. 30, 2000). Archival records included on the deletion candidate list are deleted from memory.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

This application discloses an integrated computing system and computer-implemented method for receiving, indexing and storing archive content across one or more archives that accounts for record deletion based on a retention period associated with the content, with the ability to implement one or more legal holds that are also accommodated by the deletion or disposition process. The preferred record archive disposition system and method integrates implementation of the legal hold into the regular accounting and deletion of archive content in addition to the retention period associated with that content.

The implementation of a legal hold is simplified by way of logical separation between the application of the legal hold and the records stored in the archive. Notably, metadata attributes associated with the archived records are also utilized by the legal hold process to define the scope of the legal hold, and thereby permit automated comparison between record attributes and legal hold scope attributes. For example, records may be associated with metadata attributes that designate record classes, relevant business units or legal entities, and record dates. Similarly, legal holds would include attributes designating implicated record classes, business units or legal entities, and date ranges. By establishing consistency between the metadata describing the records, and the metadata describing the legal holds, the metadata for each may be indexed for rapid automated comparison without the need to perform subjective analysis between the record object and legal holds to manually determine disposition eligibility.

It is not necessary that every metadata attribute describing the records and the legal holds be identical, for example, a legal hold may include a metadata field "outside counsel" which references the law firm handling a particular legal matter, which would not have a parallel metadata attribute in the records archive. However, certain key metadata that provide consistency in defining the scope of the legal holds and the nature of the records, typically in terms of time, subject matter, organizational (e.g., people, departments, legal entities) and perhaps geographical scope, provide a basis for automated determination of records disposition eligibility.

This parallelism in scope-related metadata provides a basis for more efficiently compensating for legal holds as part of the disposition process, rather than marking objects as subject to each legal hold that comes and goes over time, since a legal hold is only relevant as a practical matter at the time that the record would otherwise be considered for disposition through application of normal recordkeeping rules. In this regard, a legal hold is best understood as an exception to the otherwise routine records disposition process. Many current systems rely on a process of "tagging" objects as subject to a legal hold at the time the legal hold arises. The tagging process is often a feature of the archive rather than a more robust legal hold tracking process, but in either case, typically relies on setting an additional metadata attribute for the objects subject to a legal hold. The archive's disposition logic then proceeds as normal, but excludes objects that have been tagged as subject to legal hold. This is inefficient, in part, because a legal hold could arise and close during the normal timeframe for record retention, and therefore did not ultimately require the effort of tagging the held objects.

Contrary to the common practice of tagging each object subject to a legal hold as the legal holds arise, which may consume significant computational resources or otherwise be impractical given archives including potentially billions of objects, the disclosed invention provides a means of more efficiently considering legal hold implications as part of the disposition process, and by treating the metadata associated with legal holds as essentially a filtering step for objects that are otherwise eligible for disposition based on their associated recordkeeping retention period or other threshold disposition criteria. This is advantageous in terms of both time and effort required for computational work, as many businesses will have an enormous amount of assets in an archive and a simultaneously large number of legal holds active at any given time.

Also included is an optional human reporting and review step to provide transparency into the disposition process, which preferably allows the removal of archive records from the list of records to be deleted prior to execution of the deletion or disposition process.

Finally, the integrated record archive disposition system and method may culminate in a certificate of destruction, which may compare summary information regarding the original disposition against the actual executed disposition as reported to the archive, identifying any potential errors or discrepancies, and providing general documentation and summary regarding the deletion process.

As described above, the integrated record archive disposition system and method are preferably dependent on the use of consistent "metadata." Metadata may refer to uniformly formatted informational tags that may be used to identify a particular trait or characteristic of the record to which the metadata is attached. The metadata is preferably used throughout the span of the system of and method for record archive disposition. For example, one type of metadata tag may be a "record class code," which may serve as an indicator distinguishing a particular class (e.g., a type) of record, such as, for example, an electronic mail, a communication or a report. Other types of metadata may be utilized as required, identifying, for example, people, business units, countries, regions, etc.

Figure 1:
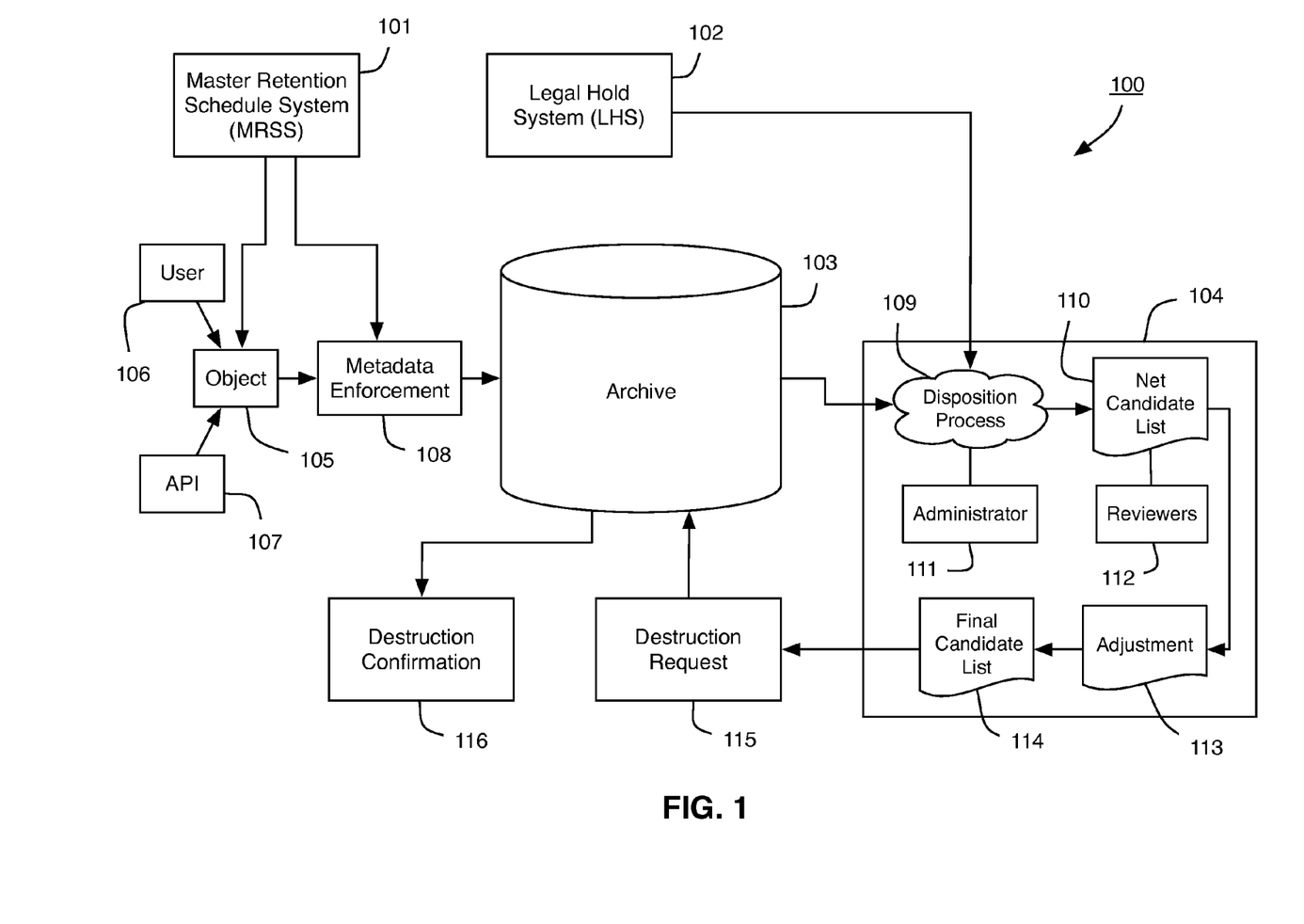
FIG. 1 is a high level representation of an illustrative records archive disposition system.

FIG. 1 is a high level representation of an illustrative records archive disposition system 100. The illustrative records archive disposition system 100 may be implemented via one or more computing modules (which, in turn, may comprise one or more computers). The integrated records archive disposition system 100 preferably includes at least four primary computing modules, namely, a Master Retention Schedule System (MRSS) 101, a Legal Hold System (LHS) 102, an Archive 103, and a Disposition Module 104. If implemented on one or more separate computer systems, then modules may be communicably joined via a computer network, such as (but not limited to) an intranet or the Internet. If the modules are operating on a single computer, they may instead represent disparate process threads, which may nonetheless logically intercommunicate during the course of thread execution. Any combination of standalone computing systems and processing threads may be utilized to implement the computing modules described below.

MRSS 101 preferably couples each record class code with a global retention period, with optional exceptions by country. For example, electronic mails may be identified with a record class code of "E," which, in turn, is coupled with a global retention period of five years. Therefore, all records having a record class code of "E" will have a retention period of five years. An exception may be made, for example, for Korea (identified by a regional record class code "K"), where e-mails have a retention period of, for example, ten years. MRSS 101 may be implemented as an independent database storing, at a minimum, record class codes and associated retention periods. MRSS 101 data may be logically organized as a table or schedule, or other similarly suitable data structures for storing the required information.

LHS 102 preferably maintains information on each legal hold. Each individual legal hold is preferably defined by metadata attributes. These metadata attributes may include, for example, the time frame for which the legal hold is applicable, people and business units subject to the legal hold, record class codes defining the subject matter scope of the legal hold, and one or more countries and/or regions defining the geographic scope of the legal hold. Alternatively, the legal hold may utilize more direct references by including, for example, the set of (or single) record objects 105 to which the legal hold applies. As mentioned above, LHS 102 may be implemented as a database operating on one or more independent computing systems or as a software process thread. Information stored by LHS 102 may be structured as a table or other similarly suitable data structures for storing the necessary information.

Archive 103 preferably stores the record objects 105 to be archived, representing, for example, electronic records archives, inventory systems for physical records, and potentially, any other application or content management system that enforces information classification and metadata consistent with the MRSS 101 and configured to interact with the disposition process disclosed herein. Metadata associated with each record object 105 may be stored in an independent database referencing the relevant object, or alongside record objects 105 within Archive 103. For example, an e-mail record object 105 may be associated with metadata including the metadata attribute "record class code" set to a value of "E" to indicate that the record in question is an e-mail. This enables Archive 103 and any other module/system (i.e., MRSS 101 and LHS 102) to instantly recognize the record class of the object without the need to analyze the actual object, but rather, by referring to its associated metadata attributes.

Archive 103 also preferably includes Metadata Enforcement module 108. Metadata Enforcement 108 may be a process executing on Archive 103 designed to enforce metadata format/usage rules on records being added to, edited, or otherwise accessed on Archive 103, thereby ensuring the consistency and usefulness of metadata tags inside the database. Archive 103 may be implemented, for instance, as one or more database computers, and is preferably communicably coupled with other system modules via a network connection, such as (but not limited to) an intranet or Internet. Archive 103 is preferably searchable as well, particularly by record class code, along with any other attribute deemed helpful to the implementation and use of the system and method for archive record disposition.

Disposition Module 104 is preferably responsible for performing computational work associated with determining whether a record that has passed its retention date should be retained due to a legal hold. The Disposition Module 104 may be implemented, for example, as a software process (embodied by Disposition Process 109), running on one or more computing systems comprising the integrated computing system and computer-implemented method for record archive disposition (such as the one or more Archives 103), or, alternatively, as one or more independent computer systems upon which the process 109 is executing on.

Disposition Process 109 is preferably a software process executing a series of instructions designed to determine whether a record should be retained. An Administrator 111 may be assigned to oversee the proper execution of the process, and preferably has substantial control over the initiation and execution of Disposition Process 109. Administrator 111 preferably represents a human being, but may also have some or all of the administrator's duties relegated to automated methods. In alternate embodiments, Disposition Process 109 may be implemented as a workflow including, for example, one or more computer implemented processes, human activity processes and other necessary processes, the sum of which may be controlled and coordinated using the GUI and other administrative interfaces on the Disposition Module 109.

Net Candidate List 110 may be a list of archive record objects 105 that have met or passed their retention dates and are eligible for deletion, and are not subject to a legal hold. Record objects 105 that are subject to a legal hold have preferably been removed from an initial list by the Disposition Process 109. Reviewers 112 may optionally be used to add human oversight to the process, altering the Net Candidate List 110 if necessary with an Adjustment 113 to create a Final Candidate List 114. The Final Candidate List 114 may then be sent to Archive 103 as a Destruction Request 115. Once deletion of the requested records is completed, Archive 103 may return a Destruction Confirmation 116.

Figure 2:
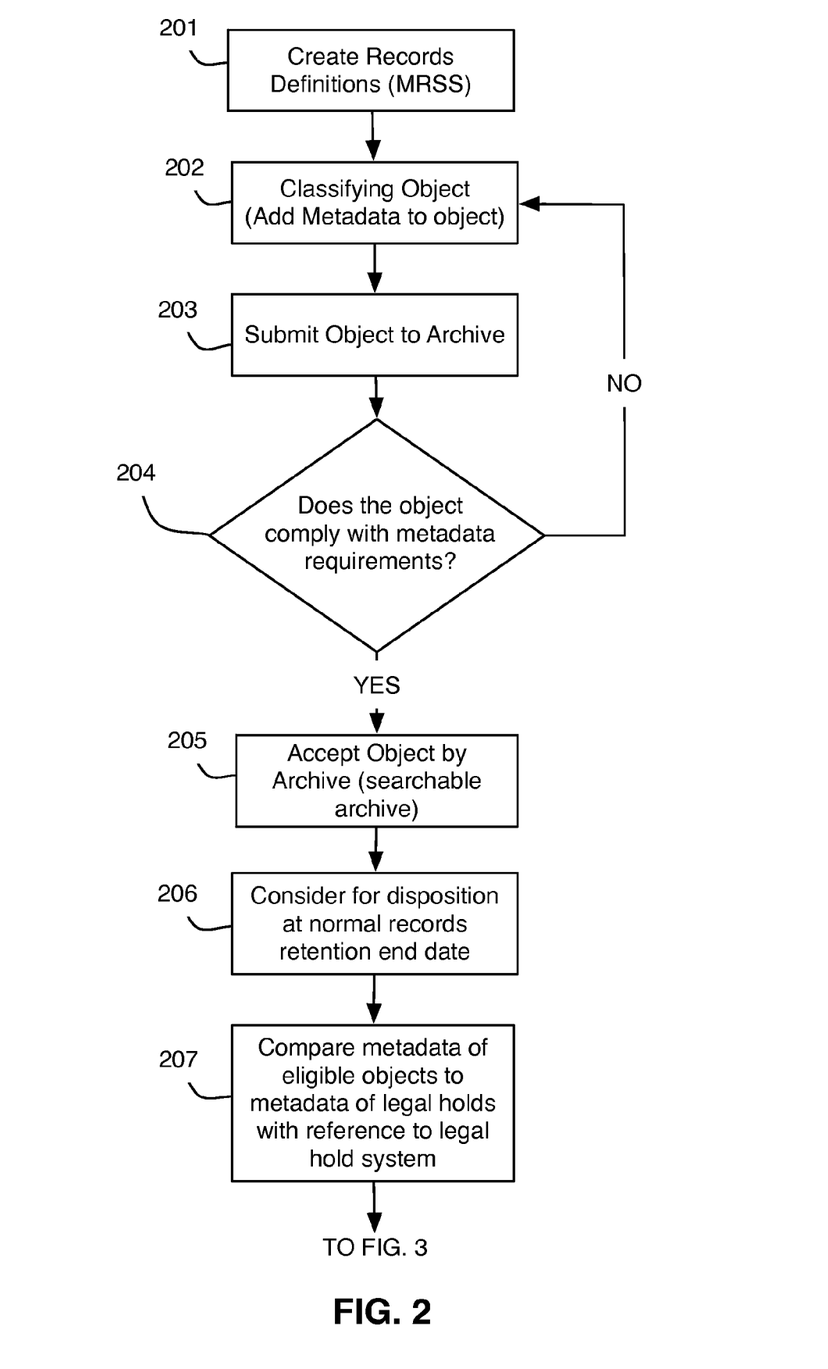
FIG. 2 is a flow chart representing a preferred sequence of steps for implementing the illustrative records archive disposition system of FIG. 1.
Figure 3:
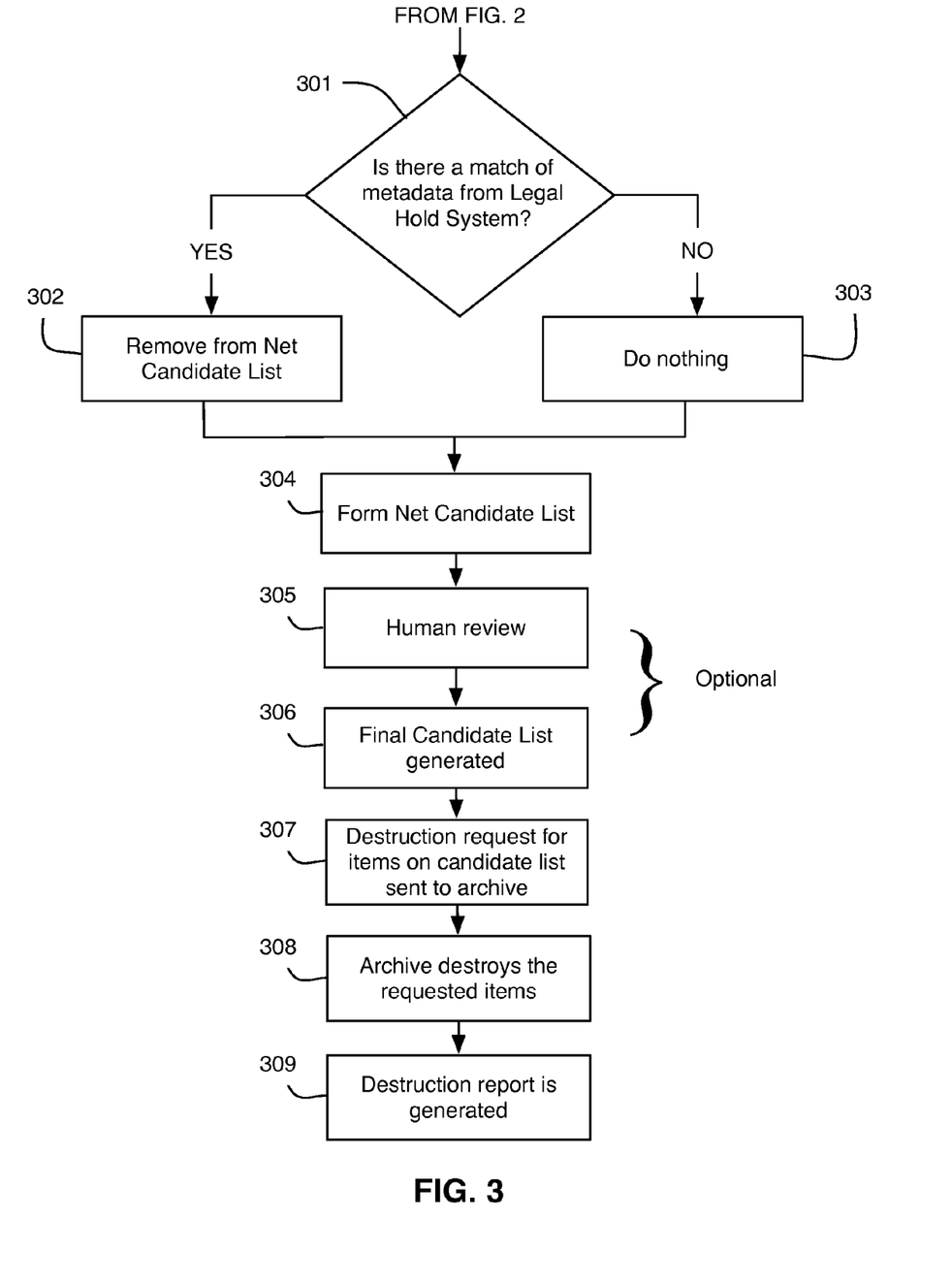
FIG. 3 is a flow chart continuing to represent the preferred sequence of steps of FIG. 2.

FIGS. 2 and 3 are flow charts representing a preferred sequence of steps for implementing the illustrative records archive disposition system 100. The process begins in step 201 by initializing the MRSS 101 module. First, record class codes and retention periods may be input into MRSS 101, generating a database/table associating each record class code with a specific retention period. Both the record class codes utilized and the duration of the retention periods are preferably selected based on the needs of the organization, in accordance with any rules or guidelines the organization is bound or elects to follow. Record class codes may be defined based on the records that need to be archived. These records will invariably fall into a set number of categories (e.g., e-mail, financial statements, internal memorandum, etc.), which may therefore define the record class codes needed to categorize them appropriately. Similarly, the retention periods may be selected based on their estimated usefulness, some responsibility to hold them for a predetermined period (e.g., legal, fiduciary, etc.), and any other factor the organization may need to consider in determining how long the records should be retained.

Archive 103 may be populated with record objects 105 to be stored. Objects 105 may be submitted to the Archive 103 manually by one or more data-entry Users 106, and/or via automated processes/systems interfacing with Archive 103 through, for example, an Application Programming Interface (API) 107. User(s) 106 would preferably add record objects 105 to Archive 103 via a graphical user interface (GUI), the computer system being connected to Archive 103 via a network connection. In this manner, a single data entry user 106 would be able to add data to a variety of one or more Archives 103 through a single entry point. Alternatively, each Archive 103 may be provided with its own data entry terminal. The API 107 utilized by systems/processes to interface with Archive 103 may be implemented according to the necessities of the design of the overall archival system in accordance with modern implementation of database/interface APIs.

In step 202, the inputting party preferably attaches metadata to record object 105, where it is then parsed through Metadata Enforcement module 108 upon submission to Archive 103 in step 203. In step 204, Metadata Enforcement 108 preferably performs a check to determine whether all the metadata tags for the relevant record class are provided with the object 105 and each conforms to the appropriate format for each metadata type. This ensures the overall integrity of the tags as applied to the record objects 105 and precludes potential future problems with the disposition process, as it is heavily reliant on the use of the metadata tags.

The metadata format is preferably a pre-set format of the metadata tags. For example, a metadata tag may have the format of "AAAA00," where "A" represents any alphabetic character and "0" represents any numerical character. Metadata Enforcement module 108 may thereby instruct a central processing unit (CPU) to compare the currently considered object 105 metadata tag to the appropriate metadata format. If the CPU encounters a tag reading "EAF134," for example, the CPU preferably rejects this tag for failing to conform to the appropriate format after a digit-by-digit comparison. If the object 105 fails to conform to the appropriate metadata format, the object 105 may be rejected and returned to the inputting party with some form of notification indicating that the metadata format is incorrect. The inputting party may then re-classify the object 105 again under step 202 and resubmit it to Archive 103. If the object 105 does comply with metadata format, then it is preferably accepted and stored in Archive 103 in step 205. Archive 103 may, therefore, receive the object 105 along with its metadata tags and store it in one or more long term storage devices, such as (but not limited to) one or more hard drives, tape drives, or any other suitable storage device utilized by the organization for the implementation of Archive 103.

Disposition Process 109 may be activated to operate on a populated Archive 103. The Administrator 111 preferably initiates the process by initiating Disposition Process 109 in Disposition Module 104. As mentioned earlier, Disposition Module 104 may be, for example, a software process (embodied by Disposition Process 109), running on one or more computing systems comprising the integrated computing system and computer-implemented method for record archive disposition (such as the one or more Archives 103), or, alternatively, as one or more independent computer systems upon which the process 109 is executing on. In either case, Disposition Module 104 preferably has a GUI that allows Administrator 111 to initiate and monitor the progress of Disposition Process 109.

Administrator 111 preferably initiates the Disposition Process 109 by utilizing the GUI to select one or more Archives 103 against which to initiate a disposition. In step 206, the Disposition Process 109 then preferably iterates through the one or more Archives 103 (using a loop, for example) and determines which record objects 105 have passed their retention date. Disposition Process 109 may accomplish this by retrieving each object 105, reading the record class code and the date of entry into Archive 103 (both preferably stored as associated metadata tags), and then comparing the data retrieved from MRSS 101, which stores coupled record class codes and retention periods. The current life of the object 105 may be calculated as the time elapsed since the date of entry into Archive 103 to the present date. If the current life of the object 105 exceeds the retention period associated with the record class code for object 105, then the object 105 may be deemed eligible for disposition. The resulting objects 105 eligible for disposition may be compiled as an initial candidate resultant list and then returned to the Disposition Module 104 and Disposition Process 109.

Some record classes may require consideration of alternative date-related metadata attributes to be considered before being deemed eligible for deletion. For example, records held for the life of an account would employ a metadata tag indicating the state of the record, such as an "account_closed" metadata attribute with possible values of "false" or "true." Records within that class would become eligible based the state of that metadata attribute. Alternatively, the deletion of some archival records may instead be partially or fully contingent on the occurrence of some event (rather than expiry of a life-span), such as an account closure event. These alternative metadata attributes may be used in addition to or in full alternative of an archival record lifespan. Additional metadata requirements would preferably be held in the MRSS 101. Objects 105 entering Archive 103 under certain record class codes may have these additional metadata attributes enforced under Metadata Enforcement 108.

In step 207, Disposition Process 109 may then begin determining which expired objects 105 are to be excluded from deletion due to the presence of an active legal hold. Disposition Module 104 preferably interfaces with LHS 102 to obtain legal hold information regarding the objects 105 on the resultant initial candidate list from step 206.

Referring to FIG. 3, Disposition Module 104 may then instruct a CPU to determine whether each object 105 on the resultant initial candidate list has a currently active legal hold based on information stored in LHS 102. The comparison may be implemented as a simple Boolean comparison operating on, for example, the object 105 identifier metadata stored in the LHS 102 module.

Alternatively, the comparison may be implemented as a comparison operating on various metadata attributes associated with multiple resources. Objects 105 may be excluded (or included) from the candidate list based on comparison of metadata attributes within the MRSS 101, Archive 103 and/or LHS 102 (along with other systems, if included). For example, customer statements may be set as eligible for deletion, but a legal hold may indicate that customer statements falling within a certain date range for a certain cost center (as defined via metadata attributes) are ineligible for deletion.

In step 301, if the object 105 identifier metadata matches the current object 105 being considered on the resultant list, the operation may return true, and the object 105 is preferably removed from the list for having a currently active legal hold in step 302. If the object 105 does not have a matching object 105 identifier metadata in the LHS 102 module, then the object 105 may remain on the resultant list. Alternatively, the metadata attributes specified by the legal hold may be compared against the metadata attributes associated with the object 105. If the attributes are a match, the object 105 is preferably excluded for having a currently active legal hold. The operation preferably iterates through the entire resultant list (and all current legal holds) before terminating. Finally, in step 304, the remaining objects 105 (i.e., those not removed from the resultant list in step 302) are preferably compiled into a Net Candidate List 110, representing objects 105 eligible for deletion for having passed their retention periods, but not subject to an active legal hold.

The Net Candidate List 110 may optionally be compiled as (or later used to generate) a human readable form of the Net Candidate List 110, enabling optional human review and intervention in step 305. The human readable form is preferably not a literal object-by-object breakdown of the current listings in the Net Candidate List 110. Instead, the eligible objects may be summarized in a form that balances an overall view of eligible record objects with transparency into specific objects, as there will often be many more objects than one can expect a reviewer, or even team of reviewers, to analyze within a short period of time. For example, a disposition of millions of electronic messages may be summarized by statistics listing the number of e-mails, organized by possible metadata attributes such as (but not limited to) business unit, region, date ranges, etc. Other large volumes of assets, such as (but not limited to) documents, memos, etc., may include similar statistics and potentially limited excerpts of content, such as, for example, a selected range of sampled titles, subjects, etc. The human readable form may be provided in the form of a report including hyperlinks, which, if activated, would run a related query in the Archive 103 to produce an excerpted result set indicative of the hyperlinked portion of the Net Candidate List 110.

The human readable variant Net Candidate List 110 preferably includes at least information regarding the original resultant candidate list from step 206 and objects 105 removed from the list as a result of the operation of steps 207 through 304. This would preferably give human reviewers 112 the opportunity to add additional record objects 105 to the Net Candidate List 110, restore objects 105 excluded by the presence of an active legal hold, or remove objects 105 included because of the absence of an active legal hold.

Net Candidate List 110 may be further subdivided by some attribute. This may be advantageous in terms of more efficient review by human reviewers 112, or may be dictated by business needs. For example, the Net Candidate List 110 may be segregated by business unit (determined by a business unit metadata attribute for each object 105), and then made available to defined business unit reviewers for human oversight of the process. As confidence is gained in the process and the methodology and criteria refined, the disposition and review process may become increasingly automated.

The process described above may be accomplished in a manner analogous to a search query, in which rather than adding the objects one by one to the disposition list and then summarizing the results, the list itself can be produced in the first instance by one or more queries that produce summary statistics regarding eligible and non-eligible objects. This query may be comprised of positive attributes reflecting routine records eligibility and negative, or filtering, legal hold attributes. For example, a query might be structured to return the number of customer statements more than ten years old, with statistics summarized by department and geographic location, together with the number of such objects to be withheld from disposition because they also have metadata that match one or more legal holds, such as excluding customer statements for particular customer numbers between certain dates associated with relevant legal matters.

Specific details about the objects would not need to be displayed in this summary view, but could appear in subsidiary views as users may choose to navigate deeper into the reporting process, such as by clicking on a hyperlink in the report noting legal hold exceptions for a particular business unit. That process could result in a more granular dynamic query into the archive in order to display additional detail that was not necessary to support the top level report, such as further detailing the number of statements and exceptions by cost center, or perhaps names of legal matters causing withheld assets and associated numbers of objects withheld in relation to each matter.

The disposition reporting process may benefit from this iterative methodology, by gathering at each step of the user interaction the further detail necessary to provide the ability to "drill down" into further details not generated at the summary view level, potentially down to the level of actually calling a query regarding specific objects being withheld, at which point the object could be retrieved from the archive for display to the reviewer. In this manner, only limited details would need to be gathered to support the summary view of the report, without expending the further computational resources necessary to gather and store all potential views of the information in the first instance that might ultimately be requested in the review process.

Different systems of human review may be implemented when multiple reviewers 112 are considering a single list. A veto-based process may be preferable over an approval-based process, in which candidate objects 105 are moved toward disposition unless a reviewer 112 takes affirmative action to restrict the disposition of objects 105.

Ideally, a workflow is preferably utilized to manage feedback from the reviewers 112 and allow them to mark candidate objects 105 for further discussion or consideration. The marked objects 105 may then be excluded from disposition unless the reviewers 112 or an administrator 111 clears the concern. In an alternative embodiment, the Administrator 111 may gather feedback manually from the reviewers 112 and adjust the Net Candidate List (or Lists) 110, providing a visual indication to reviewers 112 that part of the proposed disposition had been overridden as instructed. Additional feedback may also be utilized to identify the need to update a legal hold. In such cases, the resultant candidate list from step 206 may need to be recompared against the legal hold information in LHS 102. Only the adjusted legal hold is preferably utilized for a second comparison, as it is more efficient, and has the additional benefits of being able to display directly the consequence of the adjusted legal hold, maintain clarity between the disparate resultant candidate lists on initiation of the process and adjustments resulting from manual or legal hold updates acting upon the resultant candidate list.

Ultimately, the alterations may culminate in an Adjustment 113, which, when applied to the Net Candidate List 110, generates a Final Candidate List 114 in step 306.

In step 307, the Final Candidate List 114 is preferably sent to the one or more selected Archives 103 as a Destruction Request 115, which includes metadata required to identify to Archive 103 the objects 105 eligible for deletion. Each Archive 103 would then preferably carry out the Destruction Request 115 and return a Destruction Confirmation 116, which may constitute a report indicating the success (or percent success) of the disposition, with associated statistics and any errors encountered. Destruction Confirmation 116 may serve as (or provide) a final certificate of destruction issued by the Archive 103 showing a numerical consistency between the instruction and result, and may constitute final evidence that the destruction was accurately completed.

Similar to the process described above regarding the search-based methodology for displaying the destruction candidate report and subsidiary views, the Final Candidate List 114 may itself be expressed and provided to the Archive 103 in a manner analogous to a search query, comprised of positive and negative metadata attributes defining the populations of objects to be disposed from the Archive 103.

The record archive disposition system 100 may preferably include other processes/mechanisms for correcting and compensating with error conditions. For instance, such processes/mechanisms may include basic corrective functions for dealing with clear errors in metadata attribute caused by error during input or data corruption, procedure for locating or determining status of missing record objects 105, etc. More difficult error conditions may require human intervention, in which case, the processes/mechanisms preferably include methodology to notify human personnel of the existence and nature of the error, as well as corrective strategies so far employed.

As discussed above, the integrated computing system and computer-implemented method for record archive disposition may be implemented utilizing one or more computing systems of varying configurations. For instance, the computing systems may be combined as a single computing system. Each computing system preferably includes computing components for executing computer program instructions and processes. These components may include a central processing unit (CPU), memory, input/output (I/O) devices, and a network interface.

The CPU processes and executes computer program instructions. Random access memory (RAM) and/or fast access cache memory preferably provides fast data supply to CPU. Long-term storage may be provided as a more permanent form of computer memory, and may be, for example, a hard disk, optical disk, flash memory, solid-state memory, tape, or any other type of memory.

The I/O device(s) permit human interaction with the computer system, such as (but not limited to) a mouse, keyboard and computer display. I/O device(s) may also include other interactive devices, such as (but not limited to) touch screens, digital stylus, voice input/output, etc.

The network interface device may provide the computing system with access to a network, which may be a wireless or wired connection. The network may be, for example, the Internet, a corporate intranet, or any other computer network through which the computing system may connect to or otherwise communicate with other computers and databases, such as (but not limited to) MRSS 101, LHS 102, Archive 103, Disposition Module 104 and other databases. MRSS 101, LHS 102 and Archive 103 and any other databases represent other computerized systems or databases for specialized information that may be necessary for implementation of the integrated computing system and computer-implemented method for record archive disposition.

Software process or processes and executables (such as Disposition Process 109, for example) on the computing system may be used to provide human interfaces (such as a graphical user interface), and to store and initiate computer program instructions used to process and analyze data. Computer program code for carrying out operations described herein may be written in any combination of one or more programming languages, including an object oriented programming language such as Java, C++, C# or the like and conventional procedural programming languages, such as the "C" programming language or similar programming languages. The program code may execute entirely on the computing system, partly on the computing system, as a stand-alone software package, partly on the computing system and partly on a remote computer or server, or entirely on a remote computer or server.

This application was described above with reference to flow chart illustrations and/or block diagrams of methods, apparatus (systems) and computer program products according to one or more embodiments. It is understood that some or all of the blocks of the flow chart illustrations and/or block diagrams, and combinations of blocks in the flow chart illustrations and/or block diagrams, can be implemented by computer program instructions. The computer program instructions may also be loaded onto the computing system to cause a series of operational steps to be performed on the computer to produce a computer implemented process such that the instructions that execute on the computer provide processes for implementing the functions/acts specified in the flowchart and/or block diagram block(s). These computer program instructions may be provided to the CPU of the computing system such that the instructions, which execute via the CPU of the computing system, create means for implementing the functions/acts specified in the flowchart and/or block diagram block(s).

These computer program instructions may also be stored in a computer-readable medium that can direct the computing system to function in a particular manner, such that the instructions stored in the computer-readable medium implement the function/act specified in the flowchart and/or block diagram block or blocks. Any combination of one or more computer usable or computer readable medium(s) may be utilized. The computer-usable or computer-readable medium may be, for example (but not limited to), an electronic, magnetic, optical, electromagnetic, infrared, or semiconductor system, apparatus, device, or propagation medium. More specific examples (a non-exhaustive list) of the computer-readable medium include the following: an electrical connection having one or more wires, a portable computer diskette, a hard disk, a random access memory, a read-only memory, an erasable programmable read-only memory (e.g., EPROM or Flash memory), an optical fiber, a portable compact disc read-only memory, an optical storage device, a transmission media such as those supporting the Internet or an intranet, or a magnetic storage device. Any medium suitable for electronically capturing, compiling, interpreting, or otherwise processing in a suitable manner, if necessary, and storing into computer memory may be used. In the context of this disclosure, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in base band or as part of a carrier wave. The computer usable program code may be transmitted using any appropriate medium, including (but not limited to) wireless, wire line, optical fiber cable, RF, etc.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A method for record archive disposition implemented with a computer system comprising one or more computer processors operatively connected to memory, the method comprising:
    storing in memory archival records, each archival record being associated with at least one archival record metadata attribute;
    storing in memory at least one or more legal holds, each legal hold having legal hold metadata attributes;
    generating with at least one of the processors a deletion candidate list for at least one record type by:
        including on the deletion candidate list archival records identified as having one or more archival record metadata attributes corresponding to the at least one record type;
        excluding from the deletion candidate list identified archival records if a selected set of legal hold metadata attributes for at least one legal hold corresponds to at least a subset of metadata attributes for the identified archival records; and
    deleting from memory archival records included on the deletion candidate list.

2. The computer-implemented method of claim 1, wherein the archival record metadata attributes include at least an entry date and a record class code corresponding to a record type.

3. The computer-implemented method of claim 2, wherein each record class code is associated with a record retention period.

4. The computer-implemented method of claim 3, wherein an age of each identified archival record is determined by comparing the archival record metadata attribute entry date for each identified archival record to a current date, and including the identified archival record on the deletion candidate list if the determined age is greater than the record retention period associated with the record class code corresponding to the at least one type of record.

5. The computer-implemented method of claim 1, wherein the legal hold metadata attributes include one or more entities subject to the legal hold, one or more record types defining the subject matter scope of the legal hold, and/or a geographic scope of the legal hold.

6. The computer-implemented method of claim 1, further comprising performing with at least one of the processors an integrity check on the archival record metadata attributes for a new archival record prior to the step of storing in memory archival records, the integrity check including at least a review of the format of the archival record metadata attributes.

7. The computer-implemented method of claim 4, wherein inclusion of the archival record on the deletion candidate list is dependent upon a consideration of additional archival record metadata attributes beyond the record type, age of the archival record and corresponding legal hold.

8. The computer-implemented method of claim 1, further comprising generating an adjustment to the deletion candidate list by allowing addition and removal of archival records from the deletion candidate list prior to deletion of archival records.

9. The computer-implemented method of claim 1, wherein a certificate of destruction is automatically generated upon deletion from memory of archival records included on the deletion candidate list.

10. The computer-implemented method of claim 9, wherein the certificate of destruction compares the deletion candidate list to the deleted archival records to identify errors.

11. The computer-implemented method of claim 10, wherein the certificate of destruction includes a summarization in a human-readable format.

12. The computer-implemented method of claim 11, wherein the summarization includes information categorized according to one or more metadata attributes.

13. The computer-implemented method of claim 11, wherein the summarization includes links that retrieve an associated archival record when accessed.

14. A system for record archive disposition, comprising:
a processor; and
memory comprising program instructions, wherein the program instructions are executable by the processor to:
store in memory archival records, each archival record being associated with at least one archival record metadata attribute;
store in memory one or more legal holds, each legal hold having legal hold metadata attributes;
generate with the processor a deletion candidate list for at least one record type by:
including on the deletion candidate list archival records identified as having one or more archival record metadata attributes corresponding to the at least one record type;
excluding from the deletion candidate list identified archival records if a selected set of legal hold metadata attributes for at least one legal hold corresponds to at least a subset of metadata attributes for the identified archival records; and
delete from memory archival records included on the deletion candidate list.

15. The system of claim 14, wherein the program instructions are further executable by the process to include in the archival record metadata attributes at least a record class code that corresponds to a record type, and an entry date.

16. The system of claim 15, wherein the program instructions are further executable by the process to associate each record class code with a record retention period.

17. The system of claim 16, wherein the program instructions are further executable by the process to determine an age of each identified archival record by comparing the archival record metadata attribute entry date for each identified archival record to a current date, and include the identified archival record on the deletion candidate list if the determined age is greater than the record retention period associated with the record class code corresponding to the at least one type of record.

18. The system of claim 14, wherein the program instructions are further executable by the processor to include in the legal hold metadata attributes one or more entities subject to the legal hold, one or more class codes defining the subject matter scope of the legal hold, and/or a geographic scope of the legal hold.

19. The system of claim 14, wherein the program instructions are further executable by the processor to perform an integrity check on the archival record metadata attributes for a new archival record prior to the step of storing archival records in memory, the integrity check including at least a review of the format of the archival record metadata attributes.

20. The system of claim 17, wherein inclusion of the archival record on the deletion candidate list is dependent upon a consideration of additional archival record metadata attributes beyond the record class, age of the archival record, and corresponding legal hold.

21. The system of claim 14, wherein the program instructions are further executable by the processor to generate an adjustment to the deletion candidate list to allow addition and removal of archival records from the deletion candidate list prior to deletion of archival records.

22. The system of claim 14, wherein the program instructions are further executable by the processor to automatically generate a certificate of destruction upon deletion from memory of archival records included on the deletion candidate list.

23. The system of claim 22, wherein the certificate of destruction compares the deletion candidate list to the archival records deleted from memory to identify errors.

24. The system of claim 22, wherein the certificate of destruction includes a summarization in a human-readable format.

25. The system of claim 24, wherein the summarization includes information categorized according to one or more metadata attributes.

26. The system of claim 24, wherein the summarization includes links that retrieve an associated record archive when accessed.

* * * * *